US008334610B2

(12) United States Patent
Migliori (10) Patent No.: US 8,334,610 B2
(45) Date of Patent: Dec. 18, 2012

(54) GEARLESS PITCH CONTROL MECHANISM FOR STARTING, STOPPING AND REGULATING THE POWER OUTPUT OF WIND TURBINES WITHOUT THE USE OF A BRAKE

(76) Inventor: Robert Migliori, Newberg, OR (US)

( * ) Notice: Subject to any disclaimer, the term of this patent is extended or adjusted under 35 U.S.C. 154(b) by 410 days.

(21) Appl. No.: 12/703,633

(22) Filed: Feb. 10, 2010

(65) Prior Publication Data

US 2010/0209245 A1 Aug. 19, 2010

Related U.S. Application Data

(60) Provisional application No. 61/152,518, filed on Feb. 13, 2009.

(51) Int. Cl.
*F03D 9/00* (2006.01)
*H02P 9/04* (2006.01)
(52) U.S. Cl. .............................. 290/44; 290/55
(58) Field of Classification Search ............... 290/44, 290/55
See application file for complete search history.

(56) References Cited

U.S. PATENT DOCUMENTS

| 252,835 | A | | 1/1882 | Chamberlain | 416/9 |
|---|---|---|---|---|---|
| 2,404,290 | A | | 7/1946 | Hoover | 416/47 |
| 2,516,576 | A | | 1/1947 | Jacobs | 416/135 |
| 2,505,969 | A | * | 5/1950 | Jacobs | 416/136 |
| 2,624,531 | A | * | 1/1953 | Stalker | 244/17.13 |
| 2,717,652 | A | | 9/1955 | Nichols | 416/61 |
| 2,832,895 | A | * | 4/1958 | Hutter | 290/44 |
| 3,082,826 | A | | 3/1963 | Doman | 416/148 |
| 3,520,498 | A | * | 7/1970 | Murphy | 244/17.27 |
| 3,637,321 | A | | 1/1972 | Nekrasov | 416/123 |
| 3,700,351 | A | * | 10/1972 | Flux | 416/123 |
| 3,720,387 | A | * | 3/1973 | Foote | 244/17.25 |
| 4,025,230 | A | * | 5/1977 | Kastan | 416/18 |
| 4,083,651 | A | * | 4/1978 | Cheney et al. | 416/11 |
| 4,160,170 | A | * | 7/1979 | Harner et al. | 290/44 |
| 4,219,308 | A | | 8/1980 | Bottrell | 416/43 |

(Continued)

OTHER PUBLICATIONS

"Wind Energy Handbook;" Burton, T; Sharpe D., Jenkins N., Bossanyi, E. 2001, p. 353, Figs. 6.8: pitch linkage mechanism with caption/description. Figure shows a spider located internal to the hub on a large wind turbine.

*Primary Examiner* — Pedro J Cuevas
(74) *Attorney, Agent, or Firm* — Hancock Hughey LLP (57) ABSTRACT

Apparatuses and methods for controlling pitch angle of the wind turbine blades are disclosed. The pitch angle of all the blades can be controlled by a "spider" that moves substantially perpendicularly with respect to a plane of the turbine blades rotation. The turbine blade bearings are connected with the spider by the linkage arms. The turbine blade bearings have an axis of rotation that is substantially parallel with the longitudinal axis of the respective turbine blades. The actuating mechanism for moving the spider can be a combination of a hydraulic piston installed inside a hollow driveshaft (to move the spider in one direction) and a spring (to move the spider in another direction). An onboard controller can receive a turbine generator output signal to decide whether the turbine is overloaded or underloaded, and if so, the onboard controller can instruct a hydraulic system to add or remove fluid from the hollow driveshaft. Therefore, the power produced by the generator is adjusted up or down by the spider's adjustment of the turbine blade pitch angle.

17 Claims, 5 Drawing Sheets

U.S. PATENT DOCUMENTS

| | | | |
|---|---|---|---|
| 4,310,284 A * | 1/1982 | Randolph | 416/132 B |
| 4,329,117 A * | 5/1982 | Doman | 416/170 R |
| 4,352,629 A * | 10/1982 | Cheney, Jr. | 416/18 |
| 4,435,646 A * | 3/1984 | Coleman et al. | 290/44 |
| 4,443,154 A * | 4/1984 | Randolph | 416/11 |
| 4,519,743 A * | 5/1985 | Ham | 416/1 |
| 4,533,297 A * | 8/1985 | Bassett | 416/132 B |
| 4,545,728 A * | 10/1985 | Cheney, Jr. | 416/11 |
| 4,632,637 A * | 12/1986 | Traudt | 416/41 |
| 4,656,362 A * | 4/1987 | Harner et al. | 290/44 |
| 4,669,958 A * | 6/1987 | Peyran et al. | 416/114 |
| 4,792,281 A * | 12/1988 | Coleman | 416/156 |
| 4,909,703 A * | 3/1990 | Jacobs | 416/89 |
| 5,096,381 A * | 3/1992 | Svenning | 416/135 |
| 5,213,470 A | 5/1993 | Lundquist | 416/9 |
| 6,320,272 B1 * | 11/2001 | Lading et al. | 290/44 |
| 6,327,957 B1 * | 12/2001 | Carter, Sr. | 91/41 |
| 7,663,260 B2 * | 2/2010 | Kabatzke et al. | 290/44 |
| 7,741,728 B2 * | 6/2010 | Fortmann et al. | 290/44 |
| 8,026,623 B2 * | 9/2011 | Wakasa et al. | 290/44 |
| 8,115,331 B2 * | 2/2012 | Wakasa et al. | 290/44 |
| 2006/0275121 A1 * | 12/2006 | Merswolke et al. | 416/132 B |
| 2007/0063677 A1 * | 3/2007 | Schauder | 322/29 |
| 2008/0116690 A1 * | 5/2008 | Kabatzke et al. | 290/44 |
| 2008/0122293 A1 * | 5/2008 | Ohm | 307/86 |
| 2008/0252076 A1 * | 10/2008 | Fortmann et al. | 290/44 |
| 2011/0175354 A1 * | 7/2011 | Bo et al. | 290/44 |
| 2011/0188986 A1 * | 8/2011 | Williams | 415/1 |
| 2011/0222320 A1 * | 9/2011 | Delmerico et al. | 363/37 |
| 2012/0143565 A1 * | 6/2012 | Graham et al. | 702/181 |
| 2012/0155125 A1 * | 6/2012 | Zhang et al. | 363/34 |
| 2012/0193918 A1 * | 8/2012 | Mascarell et al. | 290/44 |
| 2012/0203385 A1 * | 8/2012 | Kumar | 700/287 |

* cited by examiner

GEARLESS PITCH CONTROL MECHANISM FOR STARTING, STOPPING AND REGULATING THE POWER OUTPUT OF WIND TURBINES WITHOUT THE USE OF A BRAKE

BACKGROUND OF THE INVENTION

This application claims a priority to the provisional U.S. Patent Applications No. 61/152,518, filed Feb. 13, 2009, which is incorporated herein by reference in its entirety.

The present invention relates generally to wind turbines. More particularly, the present invention relates to the pitch angle adjustment systems and methods. These systems and methods adjust the turbine blade pitch angle with respect to the incoming wind in order to adjust the power produced by the turbine, thereby extending the useful operating range of the wind turbine.

Due to the concerns over global warming and the limited amount of fossil fuels, alternative methods of energy production are desired. One such alternative source of energy is the wind energy produced by wind turbines, which convert kinetic energy of the wind into electricity. The performance of a wind turbine is determined by many factors: size of the turbine blades, wind speed, type of the turbine (upwind or downwind), electrical generator's converting efficiency, and the orientation of the turbine blade relative to the incident angle of the wind—i.e. the pitch angle to the turbine blades. Power that can be extracted from the wind generally scales with wind speed. It can be shown that the total available power in wind stream is proportional to the third power of wind speed. Therefore, at very low wind speeds the available power is too small to economically run the turbine. At the other side of the wind speed range, at very high wind speeds, the available wind power exceeds the electrical generator rating, thus making it necessary to stop the turbine rotation. However, the useful operating range and operating efficiency of wind turbine can be extended by changing pitch angle of turbine blades, because overall efficiency of the wind turbine is also a function of the turbine blade pitch angle.

A variety of techniques for adjusting the pitch angle of turbine blades exist in the field. Some systems for changing the pitch angle of wind turbines use a hydraulically controlled rod which is connected to turbine blades in order to adjust pitch angle of the turbine blades. However, these mechanisms are located peripherally with respect to the turbine shaft, thus needing additional space. Furthermore, these systems do not operate in power down situation. Therefore, these systems are not capable of protecting the turbine if power is lost.

Some other systems have a mechanism for adjusting the pitch of all turbine blades simultaneously, but lack any feedback loop, hydraulic actuation, or ability to protect the turbine when power is lost. Some systems rely on a per-turbine-blade pairs of gears, consequently reducing the overall reliability of wind turbine by creating multiple potential failure points. Some other systems rely on the centrifugal forces of the turbine blades themselves to adjust the turbine blade pitch angle, but, having no feathering ability or a feedback loop, are vulnerable to runaway failure when wind speed increases above the electrical generator's rating.

Therefore, a need remains for systems that can adjust the pitch angle of the turbine blades, thus controlling the electrical generator's output, while being able to provide safe feathering at high wind speeds.

BRIEF SUMMARY OF THE INVENTION

The invention is generally directed toward controlling pitch angle of the wind turbine blades. The pitch angle of all the blades can be controlled by a "spider" that moves substantially perpendicularly with respect to the plane of the turbine blades rotation. A turbine blade bearing is connected to the spider by the linkage arms. The turbine blade bearings have an axis of rotation that is substantially parallel with the longitudinal axis of the respective turbine blades. Therefore, as the spider is moved by an actuating mechanism, the linkage arms rotate the turbine blade bearings, which, in turn, rotate the turbine blades about their longitudinal axis, thus changing the pitch angle of the turbine blades. The actuating mechanism for moving the spider can be a combination of a hydraulic piston installed inside a hollow driveshaft (to move the spider in one direction) and a spring (to move the spider in another direction). An onboard controller can receive a turbine generator output signal to decide whether the turbine is overloaded or underloaded, and if so, the onboard controller can instruct a hydraulic system to add or remove fluid from the hollow driveshaft. Adding or removing fluid moves a cylinder piston, which moves the spider, which changes the pitch angle of the turbine blades. Consequently, the power produced by the generator is adjusted up or down by the spider's adjustment of the turbine blade pitch angle.

In one embodiment, an apparatus for controlling an orientation of wind turbine blades has: a turbine blade and a turbine blade bearing attached with the turbine blade. The turbine blade bearing is capable of rotating about a longitudinal axis of the turbine blade, thus capable of changing a pitch angle of the turbine blade. A spider is capable of a substantially perpendicular movement with respect to a plane of rotation of the wind turbine blades. A linkage arm connects the spider with the turbine blade bearing. The movement of the spider causes the linkage arm to rotate the turbine blade bearing, thus changing the pitch angle of the turbine blade.

In one aspect, the actuating means have: a substantially rigid piston connected with the spider; a hollow rotating driveshaft configured to house the piston at least partially; and a source of fluid. The source of fluid is configured to: at least partially fill a space inside the hollow rotating driveshaft and move the piston in a first direction when the source of fluid is pressurized, thus moving the spider in the first direction. The actuating means also have a biasing means configured to move the piston in a second direction when the source of fluid is depressurized, thus moving the spider in the second direction.

In another aspect, the piston has a first piston rod connected with the spider, the first piston rod being capable of engaging with the biasing means, a second piston rod in pressure contact with the source of fluid, the second piston rod being capable of overcoming the biasing means when the source of fluid is pressurized.

In yet another aspect, the biasing means have a spring that is at least partially housed inside said hollow driveshaft, the spring being capable of moving the driveshaft in the second direction when the source of fluid is depressurized.

In another aspect, the apparatus further has a hydraulic union in fluidic communication with the hollow driveshaft, the hydraulic union being capable of maintaining a substantially leak-proof connection when the hollow driveshaft rotates.

In another aspect, the apparatus further has a stop configured to limit the spider's range of motion in the first direction, a pressure sensor configured to detect a pressure surge when the spider contacts with the stop, and a pressure relief valve configured to open when the pressure surge is detected, thus reducing the fluid pressure.

In another aspect, the apparatus further has an onboard controller that can: receive a power output signal from a turbine generator, compare said power output signal to a target power value, generate a fluid-release control signal when the power output signal is higher than a target power value, generate a fluid-add control signal when the power output signal is lower than the target power value, and make available the fluid-release and fluid-add signals to the source of fluid.

In another embodiment, a method for controlling the orientation of wind turbine blades has the steps of: measuring phase currents on a wind turbine generator, receiving phase current measurements by an onboard controller, and determining whether a maximum of the phase current measurements exceeds a phase current rating augmented by an upper deadband. If the maximum of the phase current measurements exceeds a phase current rating augmented by the upper deadband, the method has a step of activating a fluid-release signal to decrease the amount of fluid in a hollow driveshaft, thus allowing a bias means to decrease the turbine blades pitch angle, thus decreasing the phase currents.

In one aspect, the method has the steps of: comparing the phase current measurements with the phase current ratings reduced by a lower deadband, if the phase current measurements are lower than the phase current ratings reduced by the lower deadband, activating a fluid-add signal to increase the amount of fluid in the hollow driveshaft, thus changing a pitch angle of the wind turbine blades, thus increasing the phase currents.

In another embodiment, a method for starting wind turbine blade rotation has the steps of: measuring wind speed by an anemometer, receiving said wind speed measurement by said onboard controller, determining whether the wind speed is inside an allowable range, and determining whether the wind turbine blades are fully feathered. If the wind speed is inside the allowable range and the wind turbine blades are fully feathered, activating a fluid-add signal to increase the wind turbine blades pitch, thus starting the wind turbine blade rotation.

For further understanding of the nature and advantages of the invention, reference should be made to the following description taken in conjunction with the accompanying figures. It is to be expressly understood, however, that each of the figures is provided for the purpose of illustration and description only and is not intended as a definition of the limits of the embodiments of the present invention.

DETAILED DESCRIPTION OF THE INVENTION

The invention is generally directed toward controlling pitch angle of the wind turbine blades. The pitch angle of all the blades can be controlled by a "spider" that moves substantially perpendicularly with respect to the plane of the turbine blades rotation. The turbine blade bearings are connected to the spider by the linkage arms. The turbine blade bearings have an axis of rotation that is substantially parallel with the longitudinal axis of the respective turbine blades. Therefore, as the spider is moved by an actuating mechanism, the linkage arms rotate the turbine blade bearings, which, in turn, rotate the turbine blades about their longitudinal axis, thus changing the pitch angle of the turbine blades. The actuating mechanism for moving the spider can be a combination of a hydraulic piston installed inside a hollow driveshaft (to move the spider in one direction) and a spring (to move the spider in another direction). An onboard controller can receive a turbine generator output signal to decide whether the turbine is overloaded or underloaded, and if so, the onboard controller can instruct a hydraulic system to add or remove fluid from the hollow driveshaft. Adding or removing fluid moves a cylinder piston, which moves the spider, which changes the pitch angle of the turbine blades.

Consequently, the power produced by the generator is adjusted up or down by the spider's adjustment of the turbine blade pitch angle. The details of the exemplary embodiments of the present invention are explained with reference to FIGS. 1-5.

Figure 1:
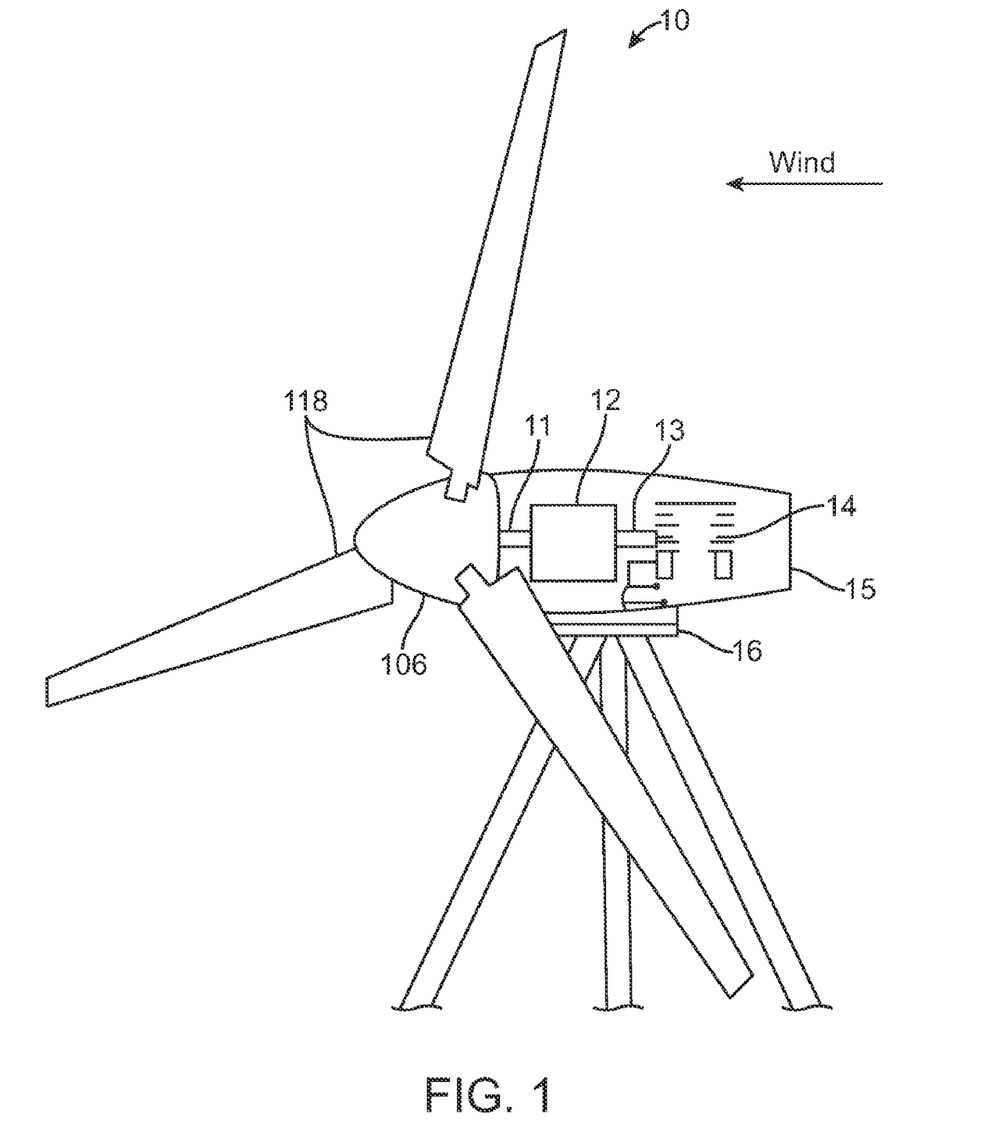
FIG. 1 shows a schematic view illustrating a wind turbine for generating electricity.

FIG. 1 shows a typical downwind turbine. Turbine blades 118 rotate due to the wind blowing generally into the plane of turbine blade rotation. Turbine blades 118 are connected to a hub 106, which rotates with the turbine blades. Hub 106 rotation spins a low speed shaft 11. Since the turbine blade rotation is typically slower than the rotation needed for the electrical generator, a gearbox 12 with a suitable transmission ratio connects the low speed shaft 11 with a high speed shaft 13, which, in turn, spins the rotor of a generator 14, thus producing electrical energy at required frequency. The rotating shafts, generator, controls, and cables are enclosed and protected inside a nacelle 15, which can be mounted over a swivel bearing 16. Rotation of the swivel bearing 16 positions the plane of turbine blade rotation against the incoming wind direction. The nacelle, turbine blades, and swivel bearing are supported on a suitable turbine tower.

Figure 2:
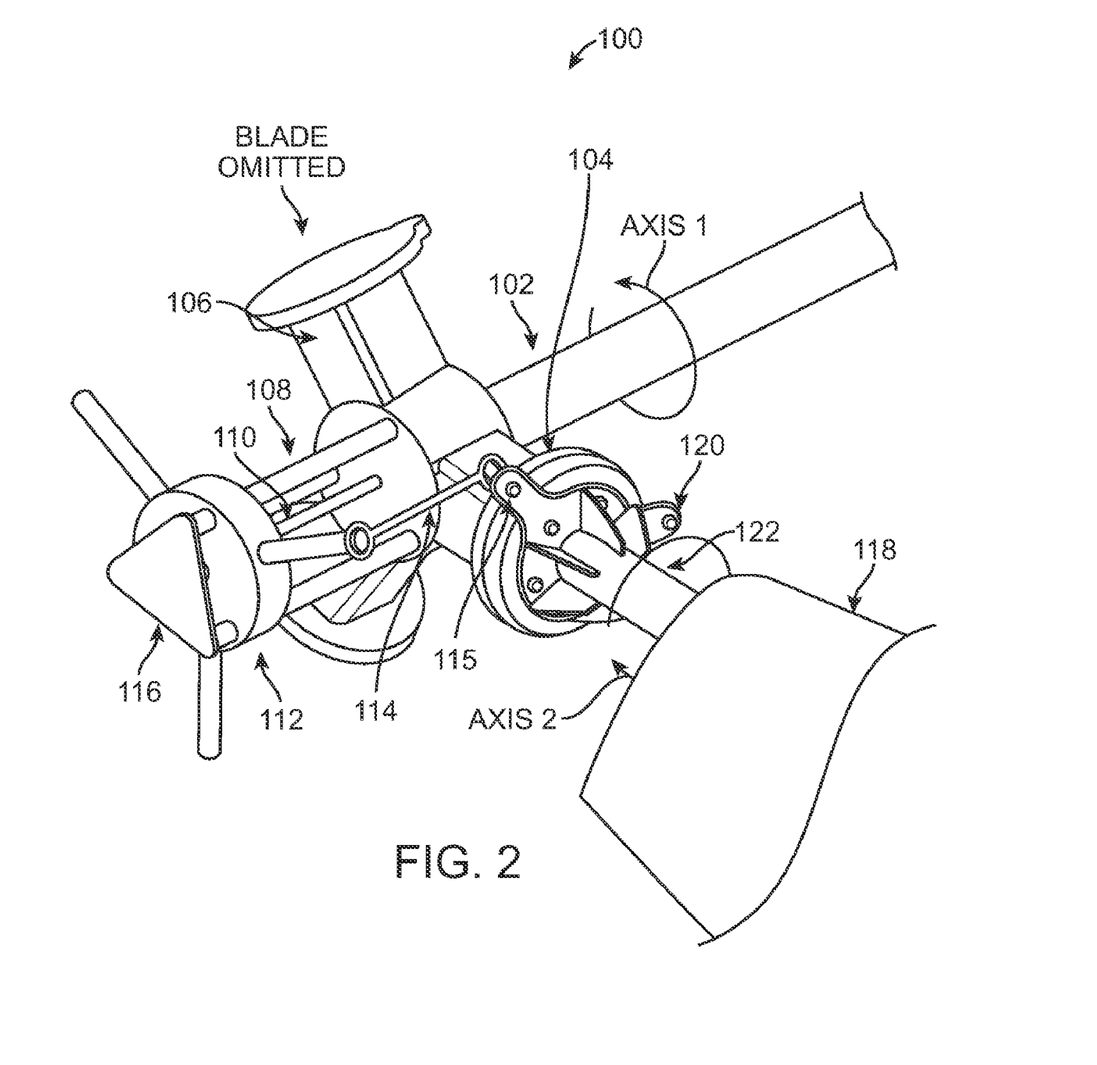
FIG. 2 shows a perspective view illustrating part of a mechanism for a turbine blade pitch angle control in accordance with one embodiment of the present invention.

FIG. 2 shows a portion of the pitch adjusting mechanism 100, which can simultaneously change the pitch angle for all turbine blades 118. As explained above, the power that can be extracted from the wind scales up with the wind speed. Thus, at very low wind speeds the available power is too small for the economical extraction, whereas at too high wind speeds the wind power may exceed the generator's power rating. FIG. 2 illustrates that a downwind turbine 10 has turbine blades 118, which rotate in a plane that is generally perpendicular to the wind direction. Turbine blades transmit torque to a generator driveshaft (not shown) whose rotation provides torque for the generator. Many generator types can be used with the wind turbine. For instance, an induction generator may be suitable due to its ability to increase the power output with the increased shaft slip, which occurs at higher wind speeds, i.e. higher wind energy levels. A spider 112 is connected with a first piston rod 110, which can be moved along the direction of a driveshaft axis 102 (axis 1) by an actuating mechanism. The spider is mounted on rails 108, which confine the spider's motion to the driveshaft axis direction and also keep the spider centered with respect to the driveshaft axis. Therefore, the actuating mechanism forces the spider to slide along rails 108. Substantially rigid linkage arms 114 connect the spider with the turbine blade bearings 104, which have rotation axis that are substantially parallel with the longitudinal axis of their respective turbine blades. Many types of the turbine blade bearings are widely available on the market. The inventor has found that slew bearings work well. Translatory movement of the spider 112 causes rotation of the turbine blade bearings 115, thus rotating the attached turbine blades 118, i.e. changing the pitch angle of the turbine blades. When the spider moves in one direction, the pitch angle of the turbine blades increases. The opposite direction of the spider movement will cause the pitch angle to decrease. All the turbine blades can simultaneously change their pitch angle based on the spider's translation, because the rigid linkage arms 114 connect the spider with each turbine blade bearing 115. As explained above, for a given turbine blade geometry, a change in the turbine blade pitch angle changes the fraction of wind energy that the turbine can harness, consequently changing the amount of the electrical power produced by the generator. Furthermore, if the wind speed is too low for an economical production of the electrical energy or too high for the rated capacity of the generator, the pitch angle can be made so low as to cause the wind turbine to stop rotating (also known as the feathered blade position). A stop 116 can be used to limit the motion of the spider away from the turbine blades.

Figure 3:
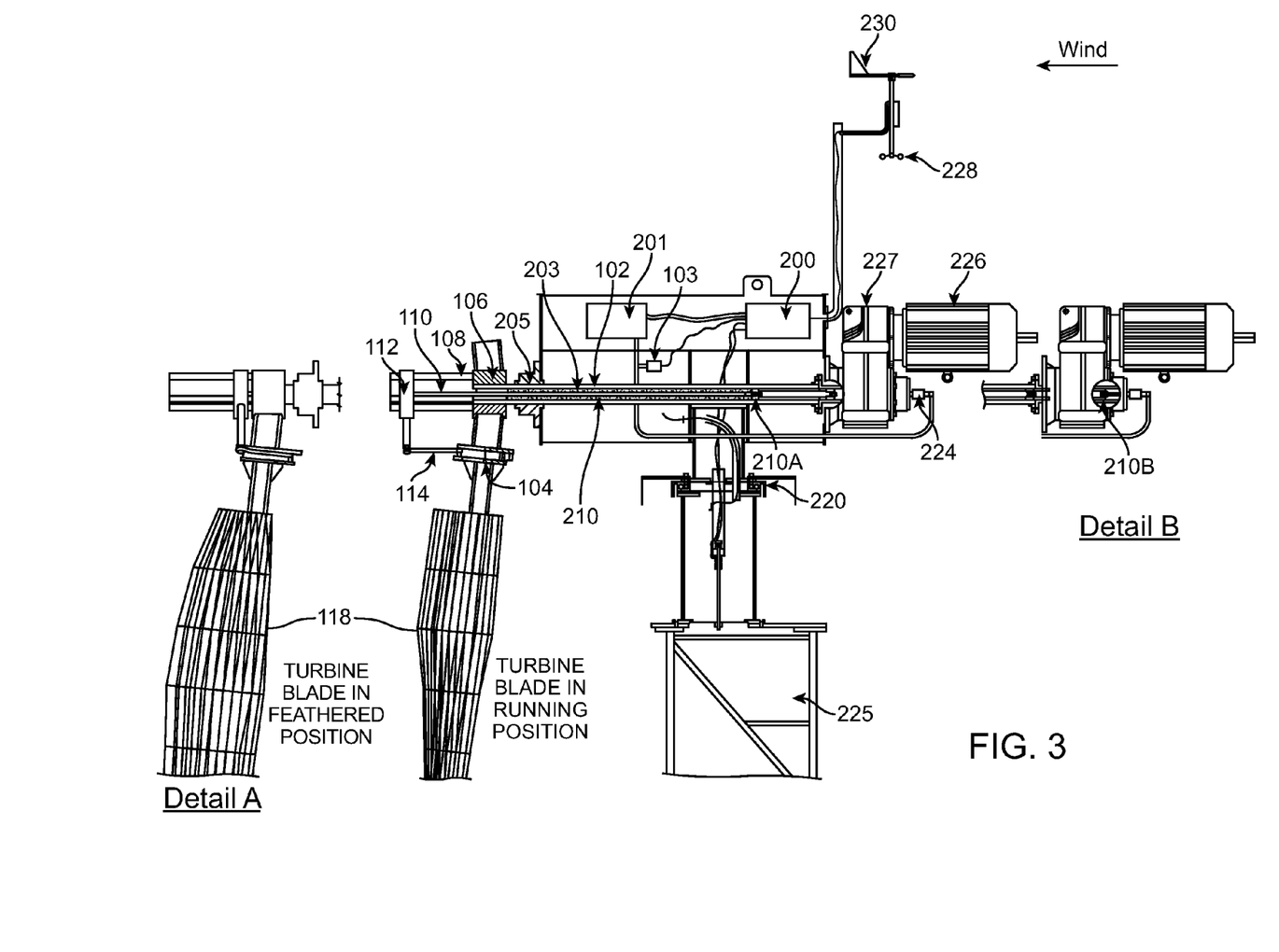
FIG. 3 shows an elevation cross-sectional view of the turbine blade pitch angle control in accordance with one embodiment of the present invention.

FIG. 3 shows an elevation cross-sectional view of one embodiment of the invention. A wind vane 230 indicates wind direction, while an anemometer 228 indicates wind speed. Many types of wind vanes and anemometers are widely available on the market. Wind direction indicated by the wind vane and wind speed indicated by the anemometer can be fed into an onboard controller 200 capable of calculating desired pitch angle of the turbine blades. The onboard controller 200, which can be a dedicated board or a general purpose computer, can send signal to a hydraulic system 201, which is in fluidic communication with piston 210. A hydraulic union 224 connects the hydraulic system 201 with the interior of the hollow driveshaft 102 which rotates with the turbine blades. The hydraulic union 224 is capable of reducing fluid losses between the rotating hollow driveshaft 102 and the stationary hydraulic system 201. The hollow driveshaft 102 transmits rotation from the hub 106 to a gearbox 227, which drives a generator 226. The hollow driveshaft is supported in part by a main shaft bearing 205. The hollow driveshaft is also capable of receiving fluid from the hydraulic system 201 through the hydraulic union. The fluid can be added into or removed from the hollow driveshaft 102 by the hydraulic system 201, based on signal received from the onboard controller 200. The addition of the fluid pushes the first piston rod away from the hydraulic union, thus pushing the spider 112 away from the hydraulic union, too. The linkage arms 114, being connected with the spider, rotate the swivel bearings, thus changing the pitch angle of the turbine blades. The inventor has found that hydraulic oils work well, but air or other fluids can also be used. Furthermore, while the hydraulic actuation of the spider 112 through a hollow driveshaft is illustrated, other actuation means are also possible, for example a rack and pinion, a gear and toothed axle, a stepper motor, and a threaded screw and threaded traveler, a hydraulic cylinder, a dual action hydraulic cylinder, a pneumatic cylinder, a dual action pneumatic cylinder, or a combination thereof. When fluid is released from the hollow driveshaft 102, the spider moves towards the hydraulic union 224, therefore changing the pitch angle of the turbine blades in the opposite angle. Therefore, the pitch angle of the turbine blades 118 can be adjusted up and down corresponding to the signal generated by the onboard controller 200, which, in turn, is based on the wind speed and/or direction. It is not necessary to know an absolute position of the spider 112, but only that it is positioned such as to limit the generator current to safe levels. This eliminates need for an expensive absolute positioning sensing. When the spider touches the stop, the fluid pressure rises rapidly at an external pressure sensor 103 located on the hydraulic supply line from the hydraulic system 201 to the hydraulic union 224. The external pressure sensor 103 can send a pressure surge signal to the onboard controller 200 to prevent further addition of fluid into the hollow driveshaft 102. Furthermore, in response to the external pressure sensor's signal, the onboard controller 200 can open a relief valve in the hydraulic system 201 to reduce the excessive pressure buildup. Additionally or alternatively, a contact sensor can be placed between the spider and the stop to indicate that the spider has touched the stop, thus reaching its extreme position.

Detail A of FIG. 3 shows a fully feathered turbine blade position. In the fully feathered position, the spider is moved to one of its extreme positions, i.e. its closest position to the hub 106. The turbine blades 118 are now facing the incoming wind at such an angle that their rotation will either stop or be minimized. Detail B of FIG. 3 shows this feathered position 210B of a piston 210. The nonfeathered, i.e. the running position of the piston 210 is indicated as 210A.

Figure 4:
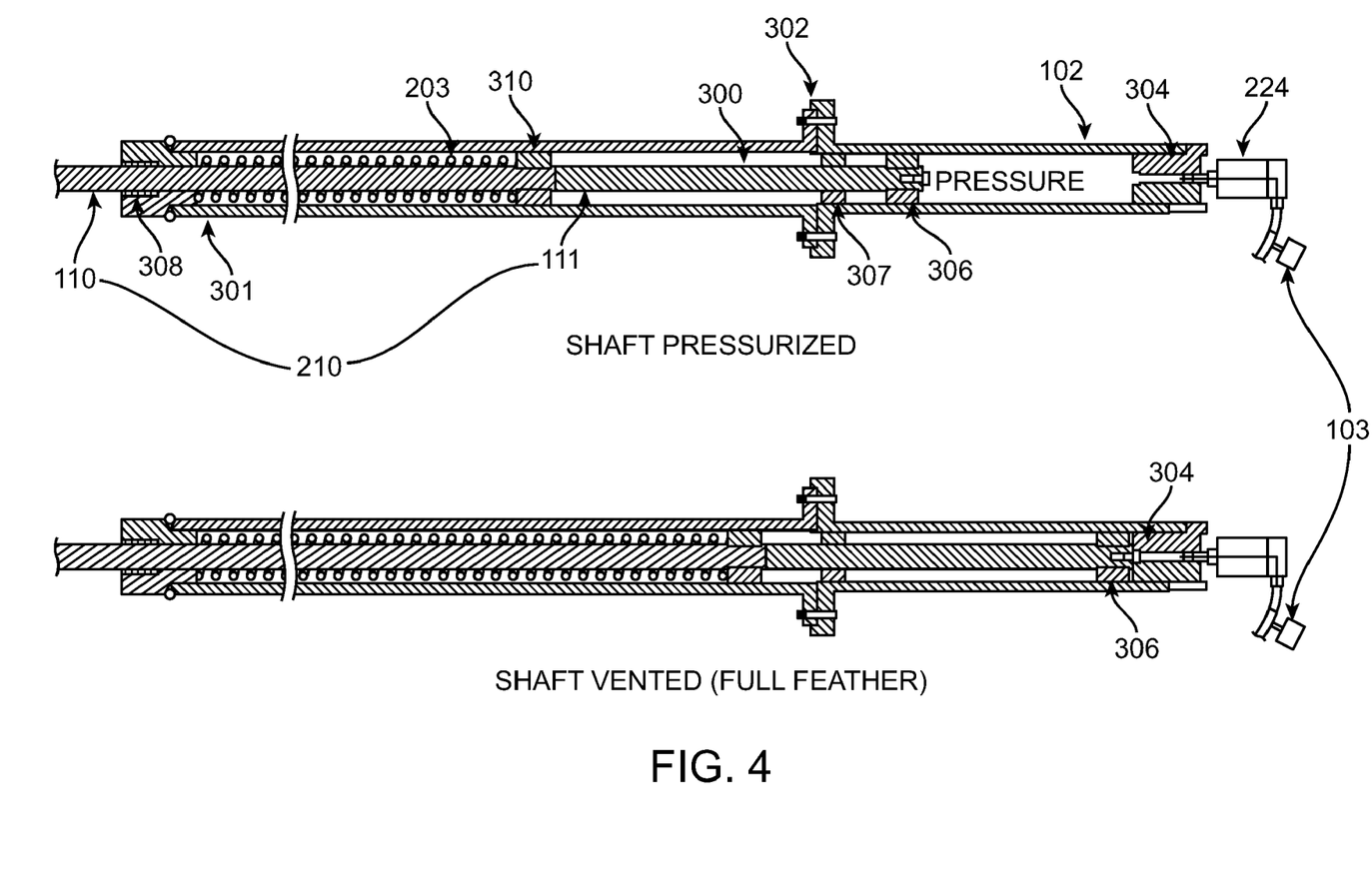
FIG. 4 shows a partial cross-sectional view of the turbine driveshaft in accordance with one embodiment of the invention.

FIG. 4 shows a partial cross-sectional view of the turbine driveshaft in accordance with one embodiment of the invention. The gearbox (not shown) has a hole sufficiently large as to accept the diameter of the hollow driveshaft 102, which must pass entirely through the gearbox. In this embodiment, the piston 210 has two rods which do not have to be fixedly connected: a first piston rod 110 and a second piston rod 111. When fluid is added to the hollow driveshaft 102 through the hydraulic union 224, the second piston rod 111 is pushed to the left, which in turn pushes the first piston rod 110, therefore moving the spider and changing the pitch angle of the turbine blades. When the opposite movement of the spider is wanted, the hydraulic system releases fluid from the hollow driveshaft 102, thus reducing the pressure in the driveshaft, and allowing a biasing spring 203 to move the piston 210 toward the hydraulic union. The biasing spring can be disposed around the first piston rod 110, between a guide 310 attached to the first piston rod 110 and a bearing 308. As fluid pressure in the driveshaft drops, the biasing force of spring 203 overcomes the fluid pressure force, thus moving the first piston rod and spider toward hydraulic union 224. As the spider is repositioned closer to the hydraulic union, a new pitch angle of the turbine blades is established. When the fluid pressure falls bellow certain threshold, the force of the spring 203 moves the spider to a fully feathered position.

If the system power is lost or the hydraulic system malfunctions, fluid pressure drops, and the spring 203 moves the spider into the feathering position, thus protecting the turbine. Therefore, the day to day operation of the turbine does not require a brake, which enhances the turbine's safety and reliability while eliminating maintenance cycles associated with regular brake adjustment. The hollow driveshaft 102 can be made of multiple segments connected by a flange 302 to enable easier removal and replacement of the parts inside the hollow driveshaft. As shown in the bottom drawing of FIG. 4, the movement of the spring 203 is limited by the contact between piston head 306 and removable end cap 304. When the piston head and the removable end cap have touched, the turbine blades are fully feathered.

Figure 5:
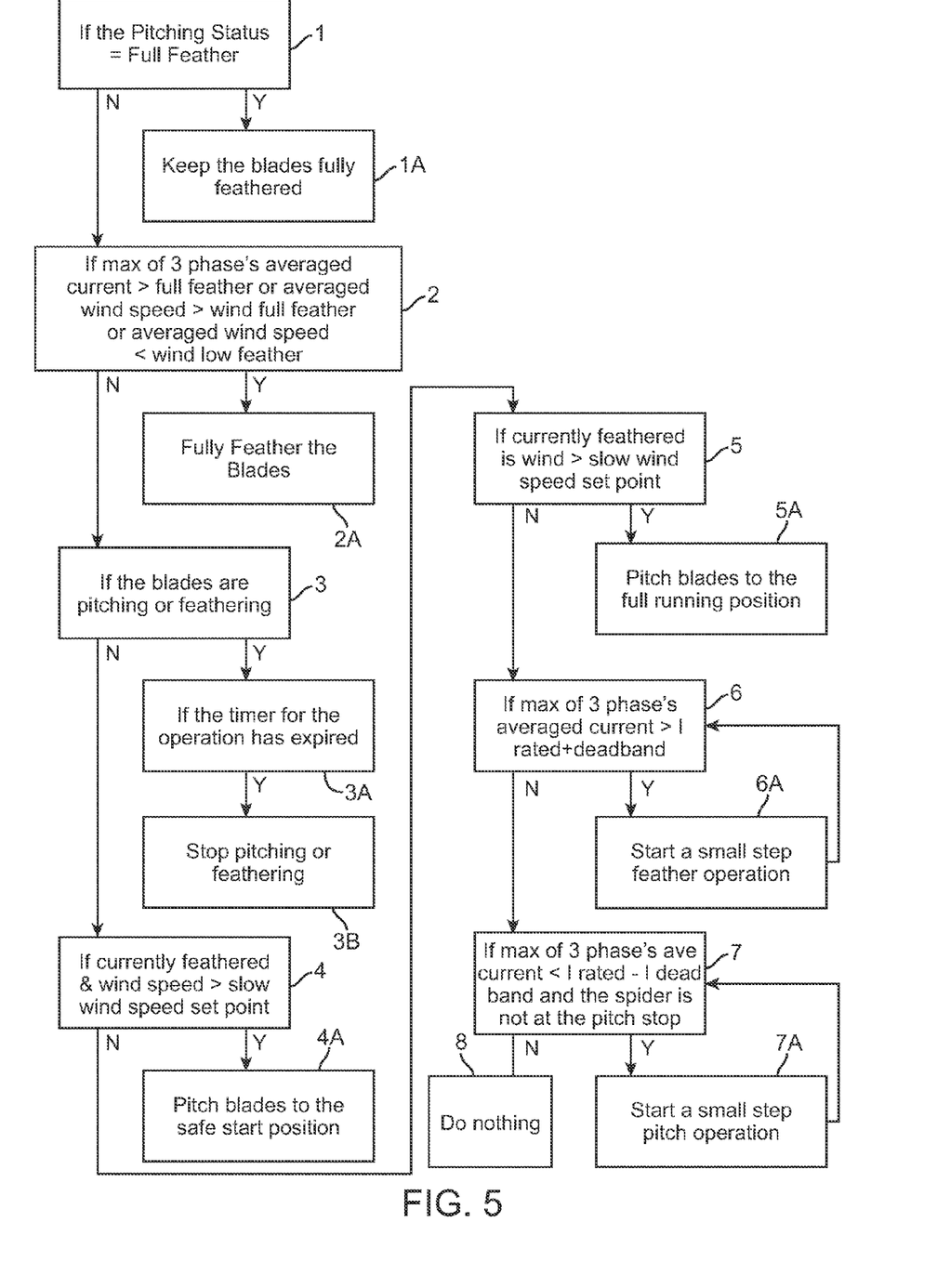
FIG. 5 is a flow diagram illustrating the steps of the turbine blade pitch angle control method in accordance with one embodiment of the invention.

FIG. 5 is a flow diagram illustrating the steps of the turbine blade angle control method in accordance with one embodiment of the invention. The onboard controller 200 has computer software which enables multiple inputs and outputs as well as sophisticated computations.

At step 1, the turbine blades are assumed to be in their fully feathered position. The onboard controller checks if the turbine blades should remain in the feathered position based on the inputs from the anemometer, wind vane, and generator phases. Hence, the onboard controller may decide to keep the turbine blades fully feathered, as in step 1A, or, in the alternative, proceed to step 2.

At step 2, the onboard controller verifies if any of the following conditions is met: (A) any phase averaged current is greater than max allowable value for the phase; (B) averaged wind speed as indicated by the anemometer is greater than the max. allowable; or (C) averaged wind speed as indicated by the anemometer is smaller than the min. allowable. If one or more of the conditions (A)-(C) are met, then the onboard controller will instruct the hydraulic system to keep the turbine blades in the fully feathered position, as in step 2A. Otherwise, if none of the conditions (A)-(C) are met, the process proceeds to step 3.

At step 3, the onboard controller verifies whether the blades are changing their pitch angle, i.e. pitching or feathering. At step 3A, verification is performed to check if the timer for the operation has expired. If the timer has expired, then the pitch angle change is stopped at step 3B. Otherwise, if the turbine blades are not changing their pitch angle, the process proceeds to step 4.

At step 4, the onboard controller verifies if the turbine blades are fully feathered while the wind speed is higher than a slow wind speed set point. If this condition is met, then the pitch angle of the turbine blades is changed to a safe start position in step 4A by issuing an appropriate signal to the hydraulic system. Otherwise, the process proceeds to step 5.

At step 5, the onboard controller verifies if the turbine blades are fully feathered while the wind speed is higher than the slow wind speed set point. If this is the case, then the pitch angle of the turbine blades is adjusted to the full running position in step 5A by instructing the hydraulic system to add fluid to the hollow driveshaft. Otherwise, the process proceeds to step 6.

At step 6, the maximum value of the electrical current of the three generator phases is found. A time averaged or instantaneous values of the generator phase currents can be used. A comparison of this maximum phase current against the rated current augmented by a deadband value is performed. If the maximum phase current exceeds the rated current augmented by the deadband, then a small step feathering operation is performed in step 6A, followed by returning to step 6. This operation will cause the hydraulic system to release some fluid from the hollow driveshaft, resulting in a small change in the pitch angle such that the torque on the hollow driveshaft is reduced. Different deadband values can be used. The inventor has found that the deadband of about 2-8% of the maximum generator current works well.

At step 7, the maximum phase current is again compared with the rated current augmented by a deadband, which may be different than the deadband in step 6. If the maximum phase current is smaller than the rated current reduced by this deadband, then a small step pitch operation is performed at step 7A, followed by returning to step 7. This operation will result in a small change in the pitch angle of the turbine blades, hence the torque on the hollow driveshaft is increased, which increases the power output of the generator. In the alternative, no action is taken, as in step 8. Thus, the software algorithm "hunts" for a spider position which maintains generator phase current output near the generator's rated maximum without knowing the absolute position of the spider.

The entire process illustrated in FIG. 5 can now be repeated by going back to step 1. The inventor has found that running the above flow diagram about 100 times per second produces good results, but other repetition frequencies can also be used.

In addition to sensing current on each generator phase, the rpm of the generator shaft can also be sensed to check for the over speed condition which could damage the mechanical components of the turbine. If the over speed condition is detected, the onboard controller responds by opening a dump valve to quickly release fluid from the hollow driveshaft, thus allowing a fast feather to occur. The rpm of the generator shaft can also be used to signal when to connect or disconnect generator 226 from the power lines.

As will be understood by those skilled in the art, the present invention may be embodied in other specific forms without departing from the essential characteristics thereof. For example, the rpm of either the hollow driveshaft or the generator shaft or both can be monitored to verify that it has not gone above the maximum allowable rpm value. The ongoing overspeed monitoring can also be performed mechanically by attaching a calibrated magnet and plunger to the hollow driveshaft 102. If the maximum allowable rpm value is reached, the magnetic force holding the plunger is exceeded, and the plunger is ejected away from the shaft by the centrifugal force. The plunger then strikes the arm of a hydraulic valve which releases the pressure in the hollow driveshaft 102 causing the blades to feather. When the change in the circuit is detected by a position sensor which senses the position of the valve arm, the onboard controller is placed in a fault mode which requires a manual restart. Many other embodiments are possible without deviating from the spirit and scope of the invention. These other embodiments are intended to be included within the scope of the present invention, which is set forth in the following claims.

What is claimed is:

1. An apparatus for controlling an orientation of wind turbine blades, comprising:
    a turbine blade;
    a turbine blade bearing attached with said turbine blade, said turbine blade bearing being capable of rotating about a longitudinal axis of the turbine blade, thus being capable of changing a pitch angle of said turbine blade;
    a spider capable of a substantially perpendicular movement with respect to a plane of rotation of the wind turbine blades;
    moving means for moving the spider in response to first and second control signals; and
    a linkage arm connecting said spider with said turbine blade bearing,
    wherein the movement of said spider causes said linkage arm to rotate said turbine blade bearing, thus changing the pitch angle of said turbine blade; and
    a controller configured to:
        receive a power output signal from a turbine generator,
        compare said power output signal to a target power value,
        generate a first control signal when the power output signal is higher than a target power value,
        generate a second control signal when the power output signal is lower than the target power value, and
        direct the first and second control signals to the moving means for controlling movement of the spider in response to the power output signal.

2. The apparatus of claim 1, wherein said moving means comprise:
    a substantially rigid piston connected with said spider;
    a hollow rotating driveshaft configured to house said piston at least partially;
    a source of fluid connected to the driveshaft to:
        at least partially fill with fluid a space inside said hollow rotating driveshaft, and move said piston in a first direction when said fluid is pressurized, thus moving said spider in the first direction; and a biasing means configured to move said piston in a second direction when said fluid is depressurized, thus moving said spider in the second direction.

3. The apparatus of claim 2, wherein said biasing means comprise a spring that is at least partially housed inside said hollow driveshaft, said spring being capable of moving said piston in said second direction when said fluid is depressurized.

4. The apparatus of claim 2, further comprising a hydraulic union in fluidic communication with said hollow driveshaft, said hydraulic union being interconnected between the rotating driveshaft and a stationary hydraulic system serving as the source of fluid, the hydraulic union being capable of maintaining a substantially leak-proof connection when said hollow driveshaft rotates.

5. The apparatus of claim 4 wherein the hydraulic system is mounted remote from, and stationary relative to, the hollow, rotating driveshaft, and wherein the hydraulic union is mounted to direct hydraulic fluid from the stationary hydraulic system into the hollow driveshaft.

6. The apparatus of claim 2, further comprising:
a stop configured to limit said spider's range of motion in said first direction,
a pressure sensor configured to detect a pressure surge when said spider contacts with said stop, and
a pressure relief valve configured to open when the pressure surge is detected, thus reducing the fluid pressure.

7. The apparatus of claim 1, wherein said moving means is chosen from a group consisting of a rack and pinion, a gear and toothed axle, a stepper motor, and a threaded screw and threaded traveler, a hydraulic cylinder, a dual action hydraulic cylinder, a pneumatic cylinder, a dual action pneumatic cylinder, or a combination thereof.

8. An apparatus for controlling an orientation of wind turbine blades, comprising:
a turbine blade;
a turbine blade bearing attached with said turbine blade, said turbine blade bearing being capable of rotating about a longitudinal axis of the turbine blade, thus being capable of changing a pitch angle of said turbine blade;
a spider capable of a substantially perpendicular movement with respect to a plane of rotation of the wind turbine blades; and
a linkage arm connecting said spider with said turbine blade bearing,
wherein the movement of said spider causes said linkage arm to rotate said turbine blade bearing, thus changing the pitch angle of said turbine blade,
a substantially rigid piston connected with said spider;
a hollow rotating driveshaft configured to house said piston at least partially;
a source of fluid configured to:
at least partially fill with fluid a space inside said hollow rotating driveshaft, and move said piston in a first direction when said source of fluid is pressurized, thus moving said spider in the first direction; and
a biasing means configured to move said piston in a second direction when said source of fluid is depressurized, thus moving said spider in the second direction;
and wherein said piston comprises:
a first piston rod connected with said spider, said first piston rod being capable of engaging with said biasing means,
a second piston rod in pressure contact with said source of fluid, said second piston rod being capable of overcoming said biasing means when said source of fluid is pressurized.

9. The apparatus of claim 8 wherein the first piston rod and the second piston rod are fixedly connected.

10. An apparatus for controlling an orientation of wind turbine blades, comprising:
a turbine blade;
a turbine blade bearing attached with said turbine blade, said turbine blade bearing being capable of rotating about a longitudinal axis of the turbine blade, thus being capable of changing a pitch angle of said turbine blade;
a spider capable of a substantially perpendicular movement with respect to a plane of rotation of the wind turbine blades;
a linkage arm connecting said spider with said turbine blade bearing,
wherein the movement of said spider causes said linkage arm to rotate said turbine blade bearing, thus changing the pitch angle of said turbine blade,
a substantially rigid piston connected with said spider for moving the spider;
a hollow rotating driveshaft configured to house said piston at least partially;
a source of fluid configured to:
at least partially fill a space inside said hollow rotating driveshaft, and move said piston in a first direction when said source of fluid is pressurized, thus moving said spider in the first direction; and
a biasing means configured to move said piston in a second direction when said source of fluid is depressurized, thus moving said spider in the second direction;
a hydraulic union in fluidic communication with said hollow driveshaft, said hydraulic union being capable of maintaining a substantially leak-proof connection when said hollow driveshaft rotates
and further comprising an onboard controller configured to:
receive a power output signal from a turbine generator,
compare said power output signal to a target power value,
generate a fluid-release control signal when the power output signal is higher than a target power value,
generate a fluid-add control signal when the power output signal is lower than the target power value, and
make available said fluid-release and fluid-add signals to said source of fluid.

11. The apparatus of claim 10, further comprising an anemometer configured to send a wind speed signal to said onboard controller system, wherein said fluid-add and said fluid-release signals are based at least in part on the wind speed signal, thus preventing unsafe turbine operation at high wind and/or unproductive turbine operation at low wind.

12. The apparatus of claim 10, wherein said onboard controller is chosen from a group consisting of a general purpose computer, an industrial onboard controller, an A/D board, a D/A board, or a combination thereof.

13. A method for controlling the orientation of wind turbine blades, comprising:
measuring phase currents on a wind turbine generator,
receiving phase current measurements by an onboard controller,
determining whether a maximum of said phase current measurements exceeds a phase current rating augmented by an upper deadband, if the maximum of said phase current measurements exceeds a phase current rating augmented by said upper deadband, activating a fluid-release signal to decrease the amount of fluid in a hollow driveshaft, thus allowing a bias means to decrease the turbine blades pitch angle, thus decreasing said phase currents, and comparing said phase current measurements with said phase current ratings reduced by a lower deadband, if said phase current measurements are lower than said phase current ratings reduced by said lower deadband, activating a fluid-add signal to increase the amount of fluid in said hollow driveshaft, thus changing a pitch angle of the wind turbine blades, thus increasing said phase currents.

14. The method of claim 13, further comprising:

measuring wind speed by an anemometer, receiving said wind speed measurement by said onboard controller, determining whether the wind speed is outside an allowable range, if the wind speed is outside the allowable range, activating a signal to fully feather the turbine blades, thus limiting or stopping the wind turbine blade rotation.

15. The method of claim 13, further comprising verifying that a spider is not at its maximum pitch position before said fluid-add signal is activated.

16. The method of claim 13, wherein said fluid-add or said fluid-release signals are activated for a limited duration of time.

17. A method for controlling the orientation of wind turbine blades, comprising:

measuring phase currents on a wind turbine generator, receiving phase current measurements by an onboard controller, determining whether a maximum of said phase current measurements exceeds a phase current rating augmented by an upper deadband, if the maximum of said phase current measurements exceeds a phase current rating augmented by said upper deadband, activating a fluid-release signal to decrease the amount of fluid in a hollow driveshaft, thus allowing a bias means to decrease the turbine blades pitch angle, thus decreasing said phase currents, and verifying that a maximum feather position has been reached by checking a signal from a contact sensor of a piston, thus preventing further fluid-release signals.

* * * * *